(No Model.) 3 Sheets—Sheet 1.
J. J. CRIST.
MOWER.
No. 506,162. Patented Oct. 3, 1893.
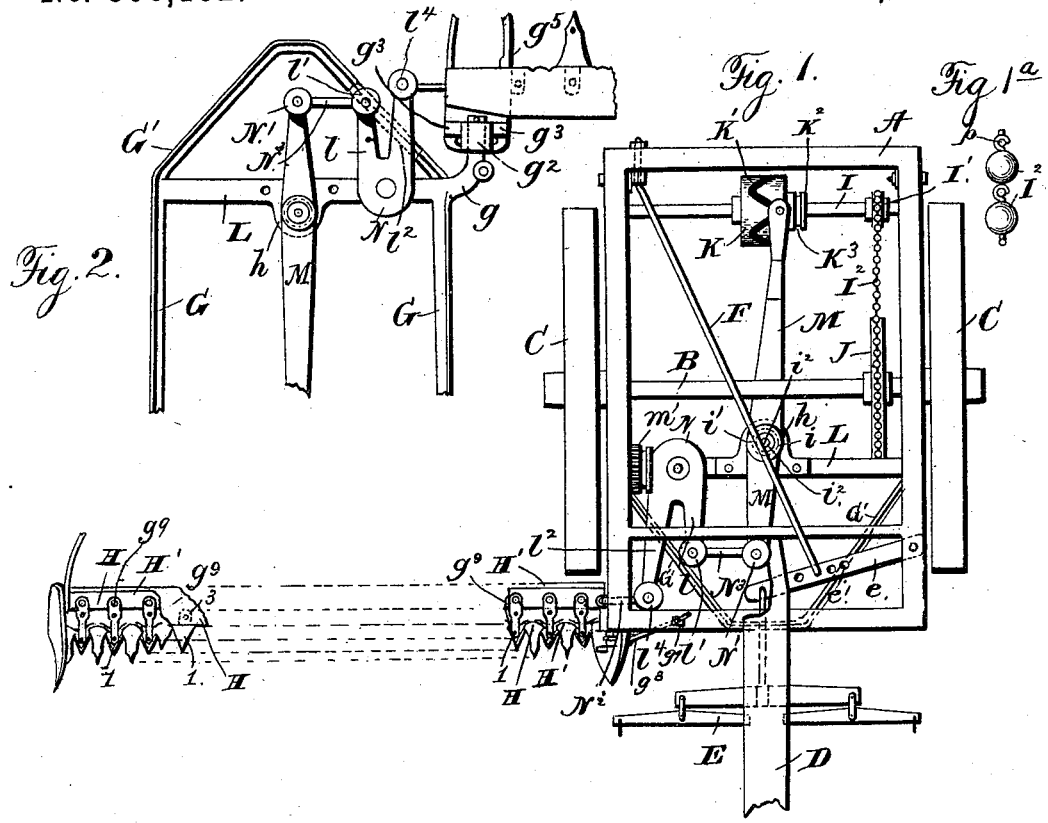
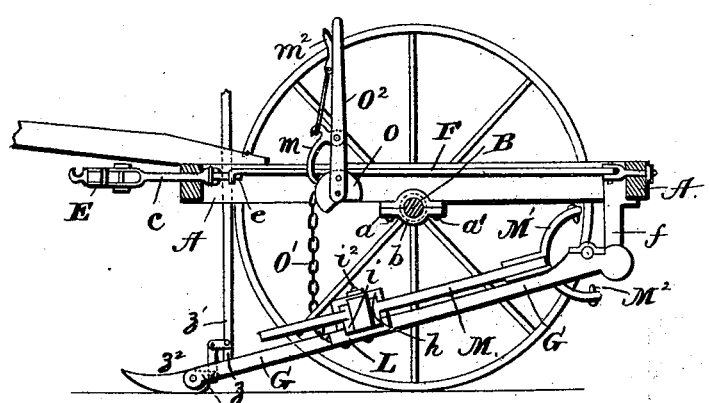
Witnesses:
Jas. E. Hutchinson.
G. F. Downing.
Inventor.
John J. Crist
By Leggett and Leggett
Attorneys (No Model.) 3 Sheets—Sheet 2.
J. J. CRIST.
MOWER.
No. 506,162. Patented Oct. 3, 1893.
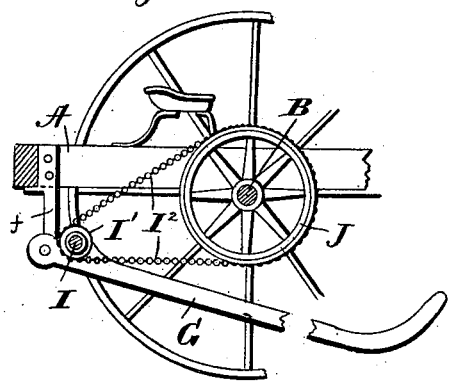
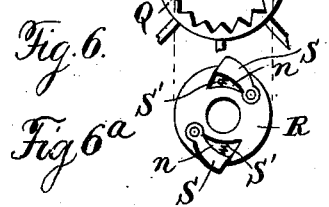
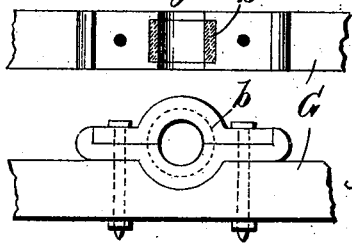
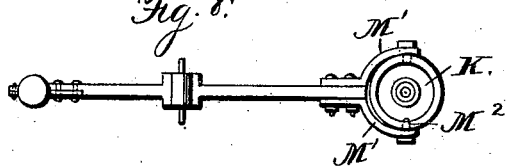
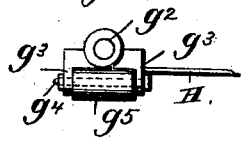
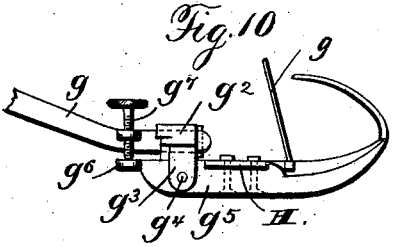
Witnesses:
Jas. E. Hutchinson
G. F. Downing
Inventor
John J. Crist
By Leggett and Leggett
Attorneys (No Model.) 3 Sheets—Sheet 3.

J. J. CRIST.
MOWER.

No. 506,162. Patented Oct. 3, 1893.

Witnesses:
G. F. Downing.
S. G. Nottingham

Inventor
J. J. Crist
By Leggett and Leggett
Attys.

UNITED STATES PATENT OFFICE.

JOHN J. CRIST, OF WICHITA, KANSAS.

MOWER.

SPECIFICATION forming part of Letters Patent No. 506,162, dated October 3, 1893.

Application filed December 9, 1890. Serial No. 374,082. (No model.)

*To all whom it may concern:*

Be it known that I, JOHN J. CRIST, a citizen of Wichita, in the county of Sedgwick and State of Kansas, have invented certain new and useful Improvements in Mowers; and I do hereby declare the following to be a full, clear, and exact description of the invention, such as will enable others skilled in the art to which it appertains to make and use the same.

My invention relates to an improvement in mowers, its object being to produce a mower which shall be simple in construction, effectual in operation and easy to manipulate.

A further object is to so construct and arrange a mower that side draft shall be compensated for.

A further object is to construct and arrange a grooved cam and the connection of a sway bar therewith, in such manner that friction between said parts shall be reduced to a minimum, and the use of oil obviated.

A further object is to so construct the machine that the operating mechanism shall be carried by a pivoted frame, and said frame be provided with means for protecting said operating mechanism from cut grass.

A further object is to provide improved cutting mechanism.

With these objects in view the invention consists in certain novel features of construction and combinations and arrangements of parts as hereinafter set forth and pointed out in the claims.

Figure 5:
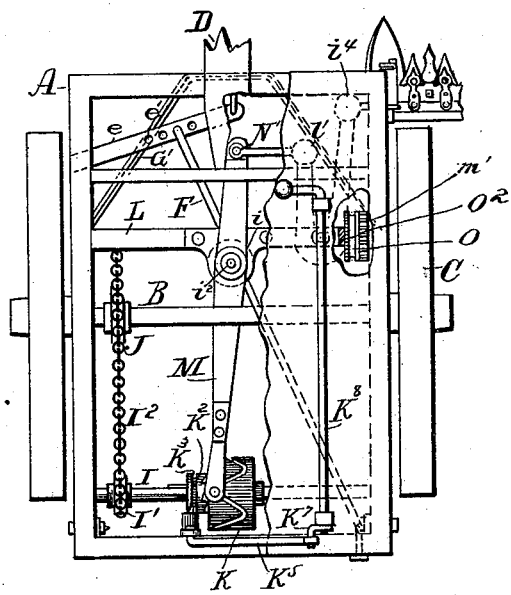
Figure 5A:
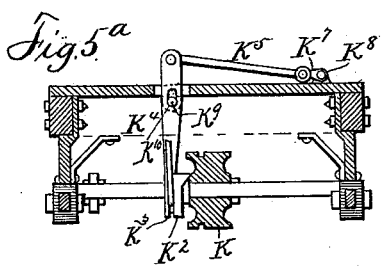
Figure 13A:
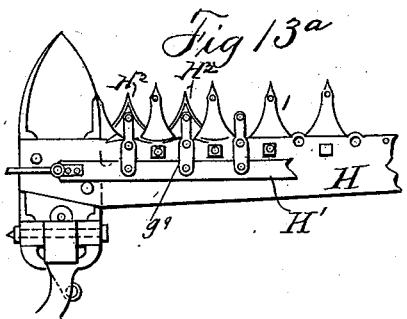
Figure 11:
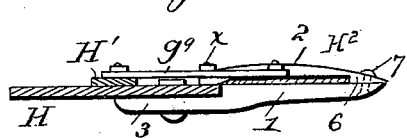
Figure 12:
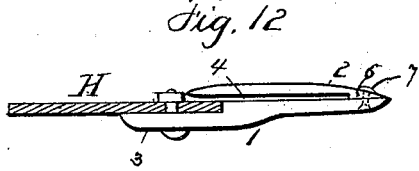

In the accompanying drawings: Figure 1 is a plan view of the machine with the floor or covering of the upper frame removed. Fig. 1$^a$ is a view illustrating a portion of the drive chain. Fig. 2 is a plan view of the forward end of the frame, showing the fender and parts connected with the pivoted frame. Fig. 3 is a longitudinal sectional view of the machine partly in side elevation showing a modification of the devices for adjusting the cutting mechanism. Fig. 4 is a sectional view partly in side elevation showing the manner of driving the shaft which carries the drum K, and the fender at the forward end of the pivoted frame. Fig. 5 is a plan view showing construction and arrangement of devices for shifting the clutch K$^2$. Fig. 5$^a$ is a horizontal sectional view taken through the drum K and showing the arrangement of device for shifting the clutch K$^2$. Figs. 6, 6$^a$, 7, 7$^a$, 8, 9, 10, 11, 12, 13, and 13$^a$ are views illustrating certain details.

A represents a main frame preferably of rectangular form, to the side bars or timbers of which, sectional journal boxes $a$ are secured by means of suitable bolts $a'$. These boxes are recessed for the reception of glass bushings $b$ and journaled in said boxes is an axle B, carrying wheels C at its ends. A tongue D is secured to the main frame A in any suitable manner and passing loosely through the forward bar of said frame, beneath the tongue, is a draw bar $c$, with the forward end of which whiffletrees E are connected. To the rear end of the draw bar $c$ a rod or bar $e$ is pivotally connected and provided with a series of perforations $e'$,—the opposite end of said rod or bar $e$ being pivotally connected with the side bar or beam of the main frame A. A rod F is provided at one end with a hook adapted to engage one of the perforations $e'$ of the rod or bar $e$ and extends therefrom diagonally across the frame and is secured at its rear end to the rear end of the main frame, as shown in Figs. 1 and 5. By this means the side draft of the machine will be compensated for.

Secured to the rear end of the main frame A are depending hangers or brackets $f$, to the lower ends of which a frame G is pivotally connected as shown in Figs. 3 and 4. The frame G is preferably made in the form shown in Fig. 2, and is provided at its forward end with an upturned guard or fender G', adapted to effectually prevent cut grass from clogging the operating parts hereinafter described, said guard or fender preferably being, in general form, V-shaped.

Projecting from the frame G preferably immediately in rear of the fender G' is an arm $g$, upon the free end of which a sleeve $g^2$ is loosely mounted. Projecting from the sleeve $g^2$ are ears $g^3$, between which a shoe $g^5$ is pivotally supported by a pin $g^4$, the side draft of the cutting mechanism being taken up by a rod $g^8$, adjustably connected to the upper frame of the machine at one end and held in position by means of a nut and at the other end said rod is connected to the shoe $g^5$. The rear end of the shoe $g^5$ is provided with an arm $g^6$, adapted to project under the arm $g$.

An adjusting screw $g^7$ is passed through the arm $g$ and adapted to bear upon the arm $g^6$ whereby the forward end of the shoe $g^5$ and the forward portions or points of the fingers of the finger bar H, secured to said shoe, may be elevated or lowered at will, said shoe turning on the pin $g^4$.

In lieu of the means above described for raising and lowering the outer edge of the cutting mechanism, the device shown in Fig. 3 may be adopted,—that is to say, an arm $z$ may be made on the lower frame G and an L-shaped lever $z'$ pivoted thereto, said lever being adapted to extend upwardly within easy reach of the operator and being provided at its lower end with a downwardly projecting arm $z^2$ which is pivotally connected to said lever at one end and at the other end is connected to an arm $z^3$ projecting from the cutting mechanism.

The fingers of the finger bar may be each made in two parts 1, 2,—the part 1 being provided with shanks 3, whereby to secure them to the body of the finger bar H, the upper surface of said body portion being adapted to lie flush with the upper face of the part 1 of the fingers. The parts 1, 2, of the fingers are preferably made V-shaped, the part 2 being bent downwardly or provided with a projection 6 at the forward end, through which a fastening device 7 is adapted to pass and thus secure said parts 1, 2, together at their forward ends. By thus securing the parts 1, 2, together at their forward ends, a space 4 is left between them for the accommodation of the knives or cutters $H^2$.

Mounted on the finger bar H and adapted to have a reciprocating motion imparted to it by means of mechanism hereinafter to be explained, is a knife bar $H'$. Pivotally connected to the finger bar at a point $x$, between their ends, is a series of levers $g^9$, said levers being also pivotally connected at their rear ends to the knife bar $H'$. At their forward ends the levers $g^9$ are riveted to the knives or cutter sections $H^2$. The knives or cutter sections are made of sufficient length to extend back beyond the pivots $x$ and said pivots are passed through the rear ends of the knives or cutter sections. From this construction it will be seen that when the cutter bar $H'$ is reciprocated the levers $g^9$ will be vibrated on their pivotal connection with the finger bar H, and with them the knives or cutter sections $H^2$ will vibrate and thus, in conjunction with the finger bars, produce a shearing action.

Mounted in the rear end of the pivoted frame G is a shaft I, to which a sprocket wheel $I'$ is keyed, over which a sprocket chain $I^2$ is passed and adapted to connect said sprocket wheel with a larger sprocket wheel J keyed or otherwise secured to the main axle or shaft B, whereby motion will be imparted from the axle to the shaft I. Mounted loosely on the shaft I, preferably at its center, is a glass cam K, having a cam or spiral groove $K'$ in its periphery. A clutch sleeve $K^2$ is located on the shaft I and adapted to rotate therewith and have a sliding movement thereon and engage the cam K, whereby said cam will be made to rotate with the shaft. The clutch sleeve $K^2$ is provided with a groove $K^3$ to receive one end of a pivoted lever $K^4$, mounted on a shaft $K^2$, which latter is supported in suitable hangers $K^{10}$ depending from the floor of the machine. To the other end of said lever $K^4$ a rod $K^5$ is pivotally connected. The other end of the rod $K^5$ is connected with a crank arm $K^7$, the other end of which is provided with a weighted foot lever $K^8$, by means of which to operate said rods and levers to manipulate the clutch sleeve $K^2$.

Located between the ends of the pivoted frame G is a cross bar L, on which a boxing $h$ is secured. Located in this boxing is a perforated boss $i$ on a lever or sway bar M. In this perforated boss, a glass bushing $i'$ is located and passing through said bushing and boxes $h$, is a pivot or bolt $i^2$, whereby the pivoted lever or sway bar M is connected to the pivoted frame G. At the rear end the sway bar is provided with curved arms $M'$ adapted to embrace the grooved cam K, said arms being provided near their free ends with inwardly projecting pins or screws $M^2$, adapted to enter the groove in the cam K, whereby the sway bar will be vibrated when the shaft I and cam K are rotated.

By making the drum K of glass, friction between it and the pins or screws $M^2$ will be reduced to a minimum. At the forward end of the sway bar M a rod or link $N^3$ is connected by means of a ball-and-socket joint $N'$, the other end of said rod or link being connected with an arm $l$, of a lever N, by means of a ball-and-socket joint $l'$. The lever N is pivotally connected to the cross bar L and is provided with an arm $l^2$ preferably somewhat longer than the arm $l$ and extending in the same direction as said arm $l$. To the forward end of the arm $l^2$ of the lever N, a pitman $N^2$ is connected by a ball-and-socket joint $l^4$, the other end of said pitman being connected to the knife bar $H'$, by a ball-and-socket joint. From this construction it will be seen that when the drum K is rotated, the knife bar will, through the medium of the sway bar M, lever N, rod $N^3$ and pitman $N^2$, be reciprocated. It may be here stated that the pivotal connection of the lever N with the cross bar L, may be provided with a glass bushing, if desired.

Secured to the main frame is a quadrant O, to which one end of a chain $O'$ is secured, the other end of said chain being secured to the pivoted frame G. Secured to the quadrant O, is an operating lever $O^2$, by means of which the quadrant may be oscillated to wind the chain thereon and raise the pivoted frame G and with it the cutting mechanism. A dog $m$ is pivoted to the lever $O^2$ and adapted to engage a toothed segment $m'$ whereby the pivoted frame G may be maintained at any desired elevation. The dog $m$ has attached to it, a latch bar $m^2$, by means of which it may be operated.

The hub of the carrying wheels will be provided with an internally notched or ratchet portion Q as shown in Fig. 6, and secured to the axle B in close proximity to said notched or ratchet portion is a disk R having recesses $n$. Pivoted to the disk R and adapted to operate in the recess $n$ and engage the notches Q, are dogs S,—beneath the free ends of which springs S' are located to maintain them in contact with the notches Q. The dogs S are so arranged that when the machine moves forward they will engage the notches Q and cause the axle B to turn, but when the machine is moved backward, said dogs ride over the notches Q and thus prevent the axle from rotating.

In constructing the sprocket chain $I^2$, hereinbefore referred to, I prefer to make it of a series of spherical bodies or links having hooks or eyes $p$, whereby to connect them together, as by this means I secure a very substantial chain and one well adapted to the purpose for which it is intended.

It is evident that slight changes might be made in the details of construction of my invention without departing from the spirit thereof or limiting its scope. Hence I do not wish to limit myself to the precise details of construction herein described, but, Having fully described my invention, what I claim as new, and desire to secure by Letters Patent, is—

1. In a mowing machine, the combination with a main frame, of a frame pivoted to the main frame at a point behind the axle and carrying the cutting apparatus, a draw bar passing loosely through the forward end of said main frame, a rod or bar pivotally connected at one end to the rear end of the draw bar and pivotally connected at its other end to one of the side bars of the main frame, and a rod connected at one end to said rod or bar at a point between its ends and at its other end secured to the rear end of the main frame, at a point behind the axle, substantially as set forth.

2. In a mowing machine, the combination with the wheels and axle, of a main frame supported at a point between its ends on the axle, brackets depending from the end of said main frame in rear of the axle of the machine, a frame pivotally connected at its rear end with said brackets, a grooved cam carried by the pivoted frame at a point in rear of the axle, a sway bar pivoted at a point in advance of the axle, and adapted at its rear end to engage said grooved drum, and cutting mechanism carried by the pivoted frame and connected with said sway bar, substantially as set forth.

3. In a mowing machine, the combination with the wheels and axle and a main frame mounted at a point between its ends on said axle, of a frame pivotally supported from the end of the main frame in rear of the axle, said pivoted frame being of a length sufficient to extend from one end to the other of the main frame and terminating at its forward end in an up-turned V-shaped guard or fender and cutting mechanism connected to one side of the guard or fender, substantially as set forth.

4. In a mowing machine, the combination with the wheels and axle and a main frame supported by said axle at a point between its ends, of a frame pivotally supported by the end of the main frame in rear of the axle, a shaft mounted in the pivoted frame in rear of the axle, a grooved cam carried by said pivoted frame, a sway bar adapted to engage the grooved cam at its rear end and extend to a point in proximity to the forward end of the pivoted frame, cutting mechanism connected with the forward end of the sway bar, sprocket wheels carried by said shaft and the axle, and a drive chain passing over said sprocket wheels, substantially as set forth.

5. In a mowing machine, the combination with a main frame, a frame pivoted thereto and a grooved drum and cutting mechanism carried by the pivoted frame, of a sway bar pivoted at a point between its ends to the pivoted frame and a V-shaped lever pivoted at its apex to the pivoted frame and at its ends respectively connected to the cutter bar of the cutting mechanism and the sway bar, substantially as set forth.

6. In a mowing machine, the combination with a main frame a frame pivoted thereto and a grooved cam and cutting mechanism carried by the pivoted frame, of a sway bar pivoted at its ends to the pivoted frame and a V-shaped lever pivoted at its apex to the pivoted frame and at its ends respectively connected to the cutting mechanism and sway bar, the connection between said V-shaped lever and the sway bar and cutting mechanism being by means of a ball-and-socket joint, and one arm of said lever being shorter than the other, substantially as set forth.

In testimony whereof I have signed this specification in the presence of the subscribing witnesses.

JOHN J. CRIST.

Witnesses:
H. G. MILLIGAN,
H. H. PURDY,
B. L. KEENAN.